(12) United States Patent
Leary et al.

(10) Patent No.: US 7,589,272 B2
(45) Date of Patent: Sep. 15, 2009

(54) BANDLIMITED DIGITAL SYNTHESIS OF ANALOG WAVEFORMS

(75) Inventors: Andrew B. Leary, San Jose, CA (US); Charles T. Bright, San Jose, CA (US)

(73) Assignee: Korg, Inc., Tokyo (JP)

( * ) Notice: Subject to any disclaimer, the term of this patent is extended or adjusted under 35 U.S.C. 154(b) by 788 days.

(21) Appl. No.: 11/028,383

(22) Filed: Jan. 3, 2005

(65) Prior Publication Data

US 2006/0145733 A1    Jul. 6, 2006

(51) Int. Cl.
*G10H 7/00* (2006.01)
*G11C 1/00* (2006.01)

(52) U.S. Cl. ........................................ 84/603
(58) Field of Classification Search ................. 84/603, 84/604
See application file for complete search history.

(56) References Cited

U.S. PATENT DOCUMENTS

| | | | | |
|---|---|---|---|---|
| 4,517,520 A | * | 5/1985 | Ogawa | 329/348 |
| 4,962,344 A | * | 10/1990 | Bohrer | 327/134 |
| 4,995,084 A | | 2/1991 | Pritchard | |
| 5,075,880 A | | 12/1991 | Moses et al. | |
| 5,260,704 A | | 11/1993 | Hustig et al. | |
| 5,434,536 A | | 7/1995 | Pritchard | |
| 5,479,168 A | | 12/1995 | Johnson et al. | |
| 5,789,689 A | | 8/1998 | Doidic et al. | |
| 5,872,531 A | * | 2/1999 | Johnson et al. | 341/110 |
| 5,977,469 A | * | 11/1999 | Smith et al. | 84/627 |
| 6,806,413 B1 | * | 10/2004 | Chidlaw et al. | 84/660 |
| 2004/0174284 A1 | * | 9/2004 | Pupalaikis | 341/141 |
| 2008/0068244 A1 | * | 3/2008 | Poulton et al. | 341/155 |

FOREIGN PATENT DOCUMENTS

| | | |
|---|---|---|
| JP | 10198378 A | 7/1998 |
| JP | P3399272 | 2/2003 |

OTHER PUBLICATIONS

Brandt, Eli, "Hard Sync Without Aliasing," Proc. 2001 International Computer Music Conference, International Computer Music Association (ICMA), pp. 365-368.
Stilson, T., et al., "Alias-Free Digital Synthesis of Classic Analog Waveforms," Proc. 1996 International Computer Music Conference, ICMA, 12 pages.

* cited by examiner

*Primary Examiner*—Jeffrey Donels
(74) *Attorney, Agent, or Firm*—Haynes Beffel & Wolfeld LLP

(57) ABSTRACT

A method for generating a bandlimited digital signal, includes generating a sequence of digital samples of a waveform, such as a sawtooth, square, or pulse waveform. The waveform has a discontinuity with a phase within a particular sampling interval. The digital samples in the sequence of digital samples of the waveform around the discontinuity are summed with a set of digital samples of an alias reducing pulse, which is based on the phase and magnitude of the discontinuity. The alias reducing pulse has essentially no DC bias, such as a pulse that is substantially odd symmetric relative to the phase of the discontinuity. The process is used in synthesis of analog synthesizer waveforms, hard sync and other waveform synthesis procedures.

60 Claims, 14 Drawing Sheets

$t_m = 0.75$    Fig. 4A    $t_m = 0.25$

BANDLIMITED DIGITAL SYNTHESIS OF ANALOG WAVEFORMS

BACKGROUND OF THE INVENTION

1. Field of the Invention

The present invention relates to bandlimited synthesis of analog waveforms used for example in music synthesis.

2. Description of Related Art

Digital synthesis of any analog waveform must be bandlimited or the resulting signal will be aliased, as discussed in Brandt, "Hard sync without aliasing," Proc. 2001 International Computer Music Conference, International Computer Music Association (ICMA), pp. 365-368; and in Stilson et al., "Alias-free digital synthesis of classic analog waveforms," Proc. 1996 International Computer Music Conference, ICMA. Stilson et al. review several known methods for producing classic analog synthesizer waveforms and describe methods of generating sawtooth and pulse waveforms based on integrating bandlimited impulse trains (See Stilson et al., FIGS. 12 and 13). In practice, the integrators required for the Stilson et al. methods can cause problems such as DC offsets at startup. Therefore, it is desirable to find a method that avoids the integration step. Also, the Stilson et al. article does not discuss important techniques in music synthesis such as hard sync or other modulations.

Brandt describes a theoretical method of adding a minimum-phase bandlimited step, called a MinBLEP in the Brandt article, to introduce a bandlimited discontinuity into a waveform. Important details for practical implementation of the Brandt method are not described. For example, the minimum-phase bandlimited step can only be applied when a proper phase and amplitude of a discontinuity has been determined. The Brandt article fails to disclose the technique for determining such proper phase and amplitudes. Fundamentally, the minimum-phase bandlimited step has a DC bias and therefore creates a frequency-dependent DC error (See Brandt, FIG. 7).

In a hard sync technique, a slave waveform having a fundamental frequency is reset in response to a master waveform having a different fundamental frequency. This causes discontinuities in the slave waveform that have various amplitudes and occur at various times within respective sampling intervals. Such discontinuities cause aliasing in sampled data representations of analog waveforms. Japanese patent number P3399272, by Yamaha Corporation, entitled "Music Sound Issuing Device and Method of Issuing New Music Sound," describes a method for synthesizing a sawtooth waveform based on a nonlinear waveshaping filter (See element 12 of FIG. 1 in P3399272). It further describes a hard sync technique that multiplies a slave waveform with a window function that is a function of the master waveform and the phase of the discontinuity (See FIG. 5 in P3399272). Nonlinear waveshaping methods and windowing methods like those described in P3399272 can reduce aliasing, but in practice still sound aliased.

It is desirable to provide improved procedures for producing bandlimited waveforms and bandlimited hard sync waveforms.

SUMMARY OF THE INVENTION

The present invention provides systems and methods for bandlimited synthesis of analog waveforms with discontinuities, such as sawtooth, square, and pulse waveforms. Embodiments of the method are applied to bandlimited synthesis of hard sync sawtooth, square, and pulse waveforms. The method applies as well to other synthesis and modulation techniques, such as soft sync, ring modulation, amplitude modulation (AM), and pulse width multiplication.

In general, an implementation of the method is used for generating a bandlimited digital signal, including generating a sequence of digital samples of a waveform, such as a sawtooth, square, or pulse waveform where the digital samples represent the values of an analog signal within respective sampling intervals. The waveform has a discontinuity with a phase within a particular sampling interval in the sawtooth, square and pulse sequence examples. The samples of the waveform around the discontinuity are summed with a set of digital samples of an alias reducing pulse, which is based on the phase and magnitude of the discontinuity.

The alias reducing pulse has essentially no DC bias in some described implementations. In some embodiments, the alias reducing pulse is substantially odd symmetric relative to the phase of the discontinuity.

Embodiments of the method include creating a table, which includes sets of digital samples of an alias reducing pulse for corresponding phases of a sampling interval. A set of digital samples, which is based on the phase of the discontinuity in the particular sampling interval of the discontinuity, is provided using a table lookup process. In some embodiments, interpolation, in combination with the table lookup process, is used for producing the set of digital samples of an alias reducing pulse based on the phase of the discontinuity.

In the case of hard sync, discontinuities in both master and slave waveforms, or first and second waveforms in which either or both can act as a master or as a slave, are bandlimited by the procedure described above. Additionally, the slave waveform is reset whenever the master waveform resets. This additional sync reset in the slave waveform creates a discontinuity that must also be bandlimited. The samples of the slave waveform around the sync reset discontinuity are summed with samples of an alias reducing pulse, which is based on the phase and magnitude of the sync reset discontinuity. The magnitude of the discontinuity is calculated by reference to the "ideal" analog signal. The ideal analog signal near the sync reset discontinuity in the slave waveform has first and second magnitudes before and after the discontinuity, respectively, that are a function of the phase of the sync reset event. The first and second magnitudes, and the sync reset phase are used in providing a set of digital samples of an alias reducing pulse with essentially no DC bias. The set of digital samples is summed with the digital samples of the slave waveform around the sync reset discontinuity to reduce aliasing.

The slave waveform may include other discontinuities in addition to the discontinuity generated in reaction to the event in the master waveform. In this example, if another discontinuity occurs in the same particular sampling interval before the sync reset event, then an additional alias reducing pulse is determined based on the phase of the other discontinuity in that same sampling interval. The set of digital samples applied in the particular sampling interval for reducing aliasing in this example is based on a combination of two alias reducing pulses. One alias reducing pulse having essentially no DC bias is provided in response to the event in the first waveform, and an additional alias reducing pulse, also having essentially no DC bias in embodiments described herein, is provided in response to the other discontinuity in the second waveform.

Embodiments of the methods described include the use of an edge buffer for the purpose of summing the sequence of digital samples of the waveform with the set of digital samples representing an alias reducing pulse. In one embodiment, where the set of digital samples representing an alias reducing pulse has a number N members, the process of summing the sequence of digital samples with the set of digital samples includes shifting a subset of the sequence of digital samples into a first-in-first-out buffer having a length of at least N−1, and using the buffer for adding the samples.

The invention includes computers and music synthesis systems configured to execute synthesis methods as described above. The invention also includes computer programs stored on machine-readable media, and executable by computers to perform the synthesis methods described above.

Other aspects and advantages of the present invention can be seen on review of the drawings, the detailed description and the claims, which follow.

BRIEF DESCRIPTION OF THE DRAWINGS

FIGS. 4A-4C illustrate a sawtooth waveform, an alias reducing pulse waveform and a bandlimited sawtooth waveform, respectively.

DETAILED DESCRIPTION

A detailed description of embodiments of the present invention is provided with reference to the FIGS. 1-14.

Figure 1:
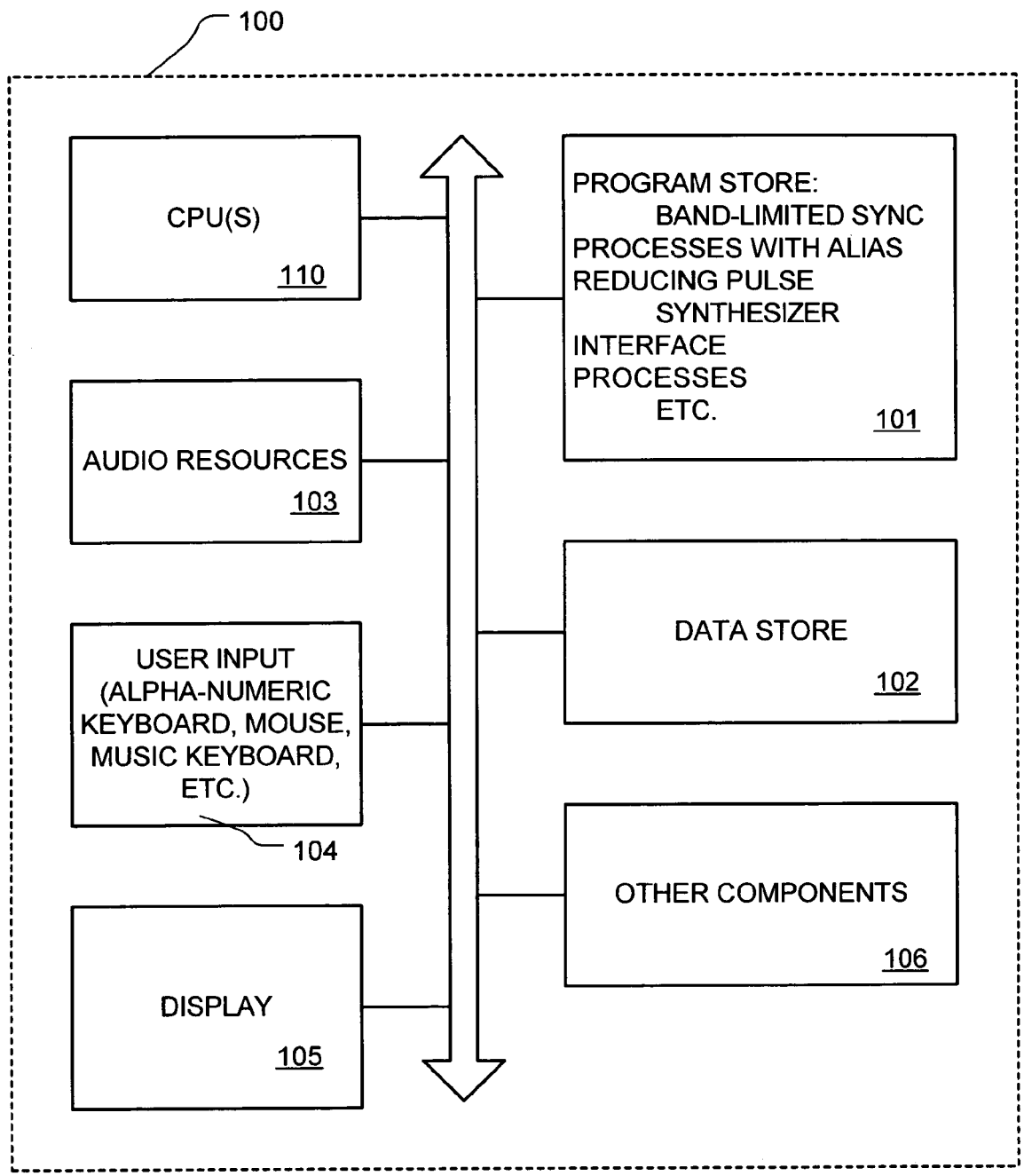
FIG. 1 is a simplified diagram of a synthesis system including logic implementing procedures for synthesizing bandlimited waveforms, including bandlimited sync processes.

FIG. 1 is a block diagram representing a basic computer system 100 configured as a music synthesizer, including data processing resources, including memory storing instructions adapted for execution by the data processing resources. The data processing resources of the computer system 100 include one or more central processing units CPU(s) 110, program store 101, data store 102, audio resources 103, user input resources 104, such as an alpha-numeric keyboard, a mouse, a music keyboard, and so on, a display 105, supporting graphical user interfaces or other user interaction, and other components 106, well-known in the computer and music synthesizer art. The program store 101 comprises a machine-readable data storage medium, such as random access memory, nonvolatile flash memory, magnetic disk drive memory, magnetic tape memory, other data storage media, or combinations of a variety of removable and non-removable storage media. The program store 101 stores computer programs for execution by the CPU(s) 110. In the illustrated embodiment, the program store 101 includes computer instructions for synthesizer interface processes, and other synthesizer processes, processes for managing the audio resources, including transducing the digital output waveforms produced by the synthesis procedures into analog waveforms and/or into to sound, mixing the digital output waveforms with other waveforms, recording the digital output waveforms, and the like. Also, in the illustrated embodiment, the program store 101 includes computer instructions for executing bandlimited sync processes, and other synthesis processes as discussed in more detail below, applying alias reducing pulses having essentially no DC bias in procedures for producing digitally sampled waveforms in which perceptible aliasing is eliminated or substantially reduced. Logic in the computer system to execute procedures and steps described herein includes the computer instructions for execution by the CPU(s) 110, special purpose circuitry and processors in the other data processing resources in the system, and combinations of computer instructions for the CPU(s) 110 and special purpose circuitry and processors. Although the embodiments described relate to synthesis of audio waveforms, where sample rates are generally less than about 100 kilohertz (KHz), embodiments of the invention can be applied to synthesis of waveforms at higher frequencies, including frequencies outside the audio range.

Figure 2:
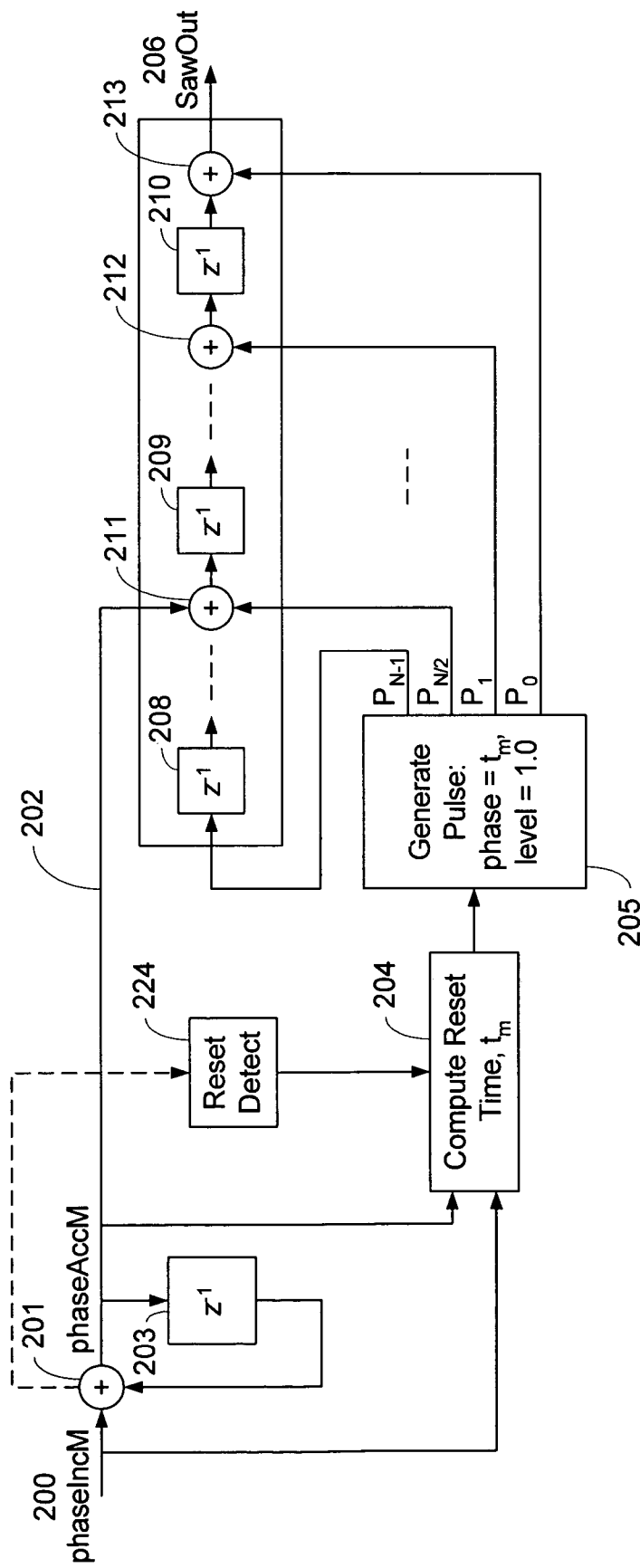
FIG. 2 illustrates a program for a bandlimited sawtooth oscillator.
Figure 3:
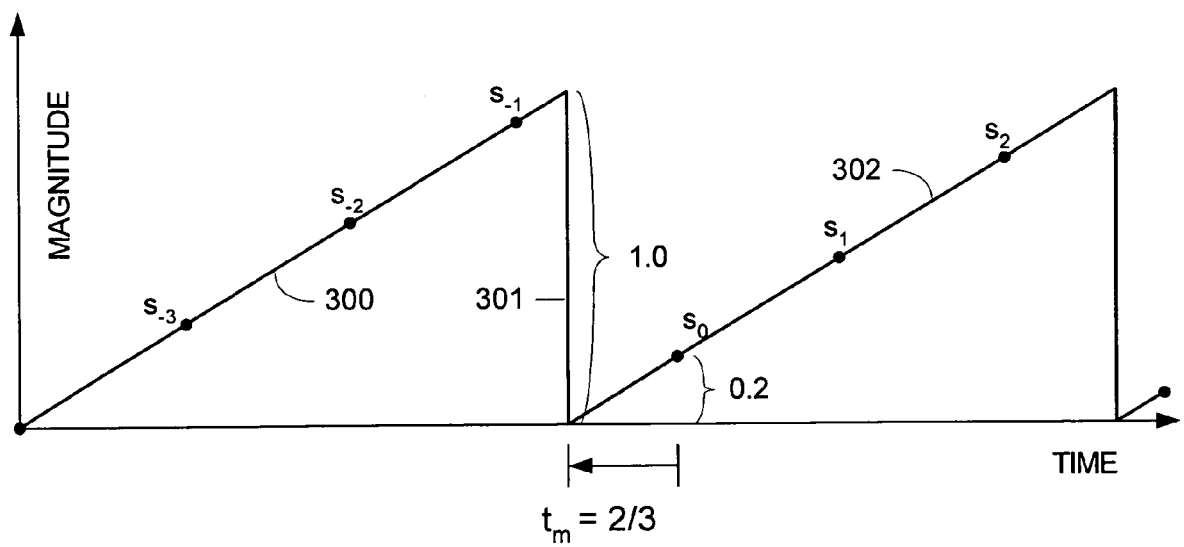
FIG. 3 is a graph illustrating a non-bandlimited sawtooth waveform, and a sequence of digital samples of the waveform.

FIG. 2 illustrates a computation procedure for a basic bandlimited sawtooth oscillator, implemented for example by a computer program in a system like that described with reference to FIG. 1. FIG. 3, illustrating sampling of a non-bandlimited sawtooth waveform, is referred to for the purposes of description of the procedure in FIG. 2. Basically, one period of a sawtooth waveform includes a ramp 300 with a constant slope from zero to one (or some amplitude which can be scaled to one for the purposes of the procedure), and a step 301 at which the ramp is reset to zero, where the step 301 is a discontinuity in the waveform. The following period of the sawtooth waveform begins with a ramp 302 having the same constant slope, and the ramp and reset cycles continue so that they resemble a sawtooth pattern. To synthesize a sawtooth waveform having an arbitrary frequency, a sequence of digital samples is provided using a sample rate that can be independent of the arbitrary frequency of the waveform. For example a sample rate of 48 KHz is often used in music synthesis. Waveforms having frequency components of up to about 20 KHz are often produced for conversion to audio outputs, and the sample rate is chosen so that it is greater than twice the highest frequency component of the expected output waveforms. In FIG. 3, a current sample for the purposes of this discussion is sample $s_0$. Samples generated earlier in time appear to the left, and include samples $s_{-1}, s_{-2}, s_{-3}, \ldots$. Samples generated later in time appear to the right, and include samples $s_1, s_2, \ldots$. In FIG. 3, the phase increment, or digital frequency, is 0.3. Thus, sample $s_{-3}$ has a magnitude of 0.3, sample $s_{-2}$ as a magnitude of 0.6 and sample $s_{-1}$ the magnitude of 0.9. The waveform resets at the step 301 between sample $s_{-1}$ and sample $s_0$, at a particular phase $t_m$ within the sampling interval represented by sample $s_0$. Therefore, the sample $s_0$ has a magnitude which is a function of that particular phase $t_m$. In the example illustrated, the phase $t_m$ of the reset step 301 is ⅔ of the sample period (or sampling interval). The magnitude of the sample $s_0$ is likewise ⅔ of the phase increment, or 0.2. As the waveform is generated, the phases $t_m$ of the reset within corresponding sampling intervals change, unless the sample rate is an integer multiple of the frequency of the waveform.

The step 301 and the subsequent steps have high frequency components that are not bandlimited to below the Nyquist frequency. Sampling such a non-bandlimited signal results in aliasing since the discontinuities in the waveform are quantized to the nearest sampling interval. The aliasing in the audio context causes the resulting sequence of digital samples to have an unpleasing sound. The procedure of FIG. 2 reduces the aliasing, and may eliminate any perceptible aliasing in some embodiments.

The procedure shown in FIG. 2 includes a basic phase accumulator type, sawtooth oscillator process. The procedure includes receiving an input phase increment phaseIncM on line 200, and applying it to a summing node 201, for each sample interval. The summing node 201 wraps when the accumulated magnitude exceeds 1.0, so that the magnitude of a next sample depends on the phase within the sampling interval at which the reset step in the waveform occurs. The output of the summing node 201 is applied as a phase accumulator output phaseAccM on line 202, and fed back as the immediately preceding sample $s_{-1}$ through a delay stage 203 as a second input to the summing node 201. The phase accumulator output phaseAccM on line 202 consists of a sequence of digital values of a non-bandlimited sawtooth waveform. Because the sample interval is fixed, or has a limited number of selected sampling rate values, and wraps at 1.0, the phase increment phaseIncM has the effect of establishing the fundamental frequency of the sawtooth waveform.

The phase accumulator output phaseAccM on line 202 is also applied to a module 204 along with the phase increment phaseIncM from line 200, which computes the phase of the reset step, called reset time $t_m$ in this procedure diagram. The module 204 as illustrated includes a reset detect function 224 which signals the module 204 when the summing node 201 resets or wraps. The reset time $t_m$ is applied as input to module 205 that generates an alias reducing pulse. In this example, the magnitude of the reset step is always 1.0, and the magnitude of the alias reducing pulse, as provided in the module 205, matches that known magnitude. The output of the module 205 is a set of samples of an alias reducing pulse, having N members, and designated $P_0, P_1, \ldots, P_{N/2}, \ldots P_{N-1}$ in the illustrated procedure. The sequence of digital samples of the non-bandlimited waveform on line 202, and the set of samples $P_0, P_1, \ldots, P_{N/2}, \ldots P_{N-1}$ of the alias reducing pulse, are applied to an edge buffer structure 206.

The edge buffer structure 206 includes a delay line composed of delay elements (208, 209, 210 shown in the figure) with summing nodes 211, 212, 213. A current sample $s_0$ of the sequence of digital samples of the non-bandlimited waveform on line 202 is fed into the edge buffer 206 at summing node 211, along with a corresponding sample $P_{N/2}$ from the set of samples of the alias reducing pulse. The resulting sum is stored in the delay element 209 in the current cycle. In the following cycle, the sample $s_1$ of the sequence of digital samples of the non-bandlimited waveform on line 202 is fed into the edge buffer 206 at summing node 211, along with the sample $P_{N/2+1}$ from the set of samples of the alias reducing pulse, and so on until the sample $P_{N-1}$ is summed with the corresponding sample of the non-bandlimited waveform on line 202. The samples $s_{-1}, s_{-2}, \ldots$ from the sequence of digital samples from line 202, which preceded the current sample $s_0$, are stored in the delay elements 209 and 210 in the current cycle, being shifted from the previous delay elements. Summing node 212 sums the output of delay element 209 with the sample $P_1$, and the summing node 213 sums the output of the delay element 210 with the sample $P_0$. In this manner the set of samples of the alias reducing pulse is combined with the samples of the sequence of digital samples of the waveform around the discontinuity caused by the waveform step upon the wrapping at the summing node 201.

The edge buffer 206 can be implemented by simply executing a copy operation from element to element, or by using typical circular buffer techniques in which pointers are used for addressing data in the circular buffer and incremented as appropriate according to well known procedures.

The length of the edge buffer 206 can be varied along with the number of members of the set of samples of the alias reducing pulse. For example, one implementation includes a set of samples of the alias reducing pulse which includes four members. The edge buffer 206 can include three storage locations and three summers in a four member set of samples of the alias reducing pulse.

Figure 4B:
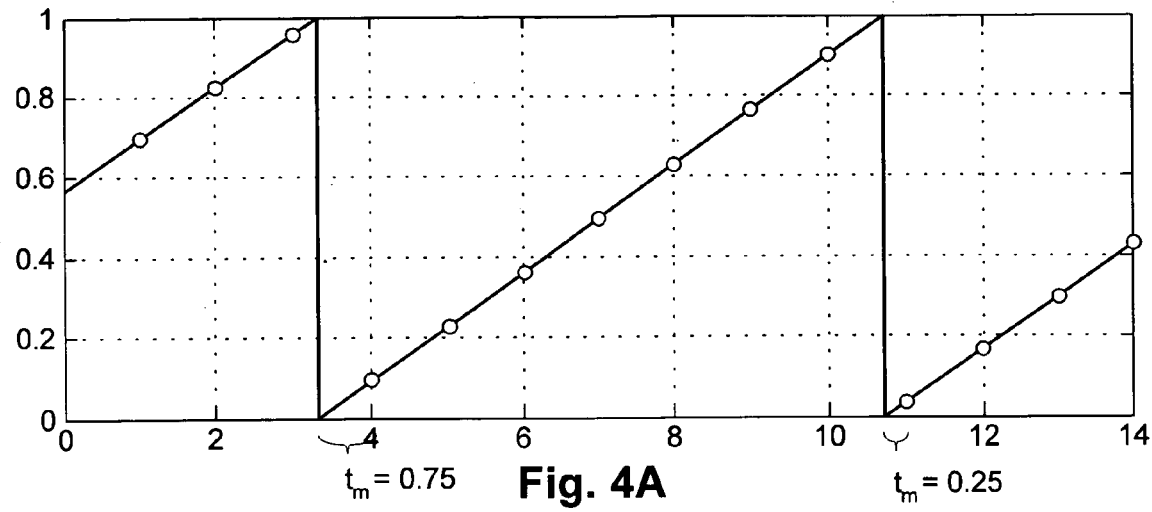
Figure 4B:
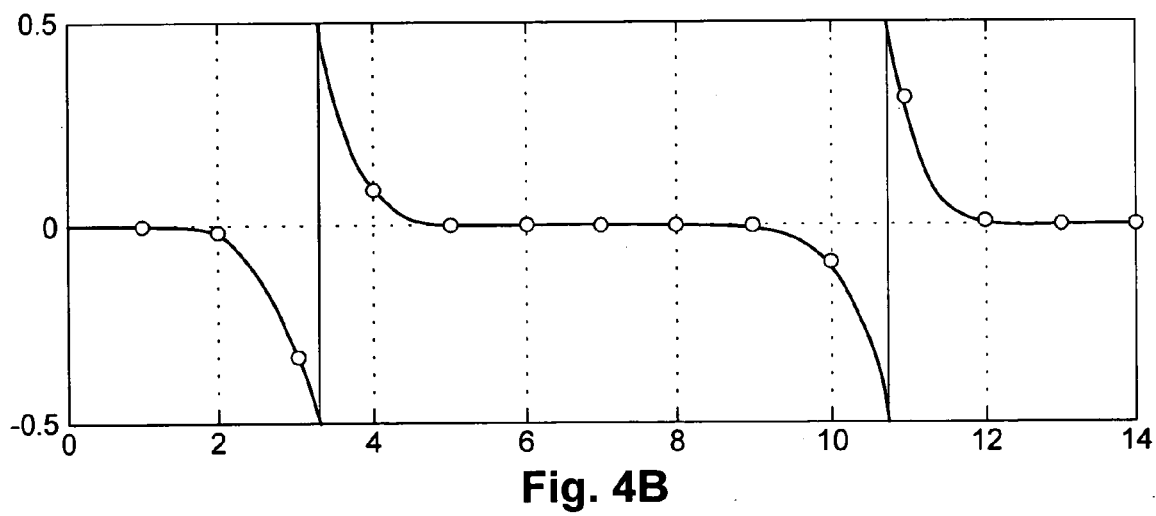
Figure 4C:
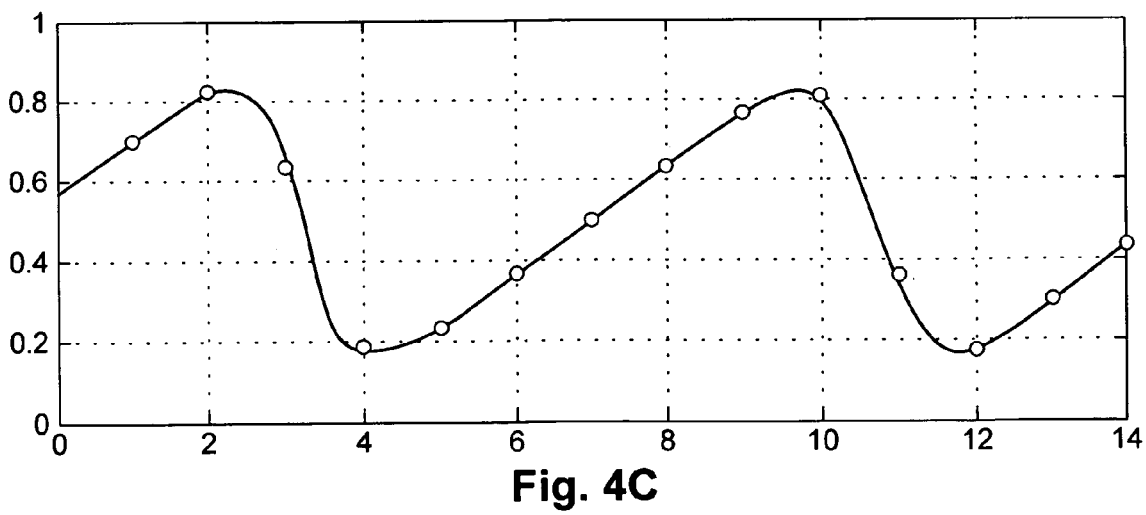

FIGS. 4A-4C illustrate a non-bandlimited sawtooth waveform, the alias reducing pulse and the bandlimited waveform produced by the technology described with reference to FIG. 2. FIG. 4A shows a sawtooth waveform with samples at times t=0 to t=14 along the horizontal axis, and the amplitudes of the samples are marked by circles on a trace of the ideal waveform. Resets occur at times t=(4−0.75) and t=(11−0.25). FIG. 4B shows the alias reducing pulses, centered at times t=(4−0.75) and t=(11−0.25). The shapes of the alias reducing pulses are determined so that they cancel high frequency components of the discontinuity, and so that they have essentially no DC bias. For example the alias reducing pulse for the sawtooth wave reset is odd symmetric about the reset time, and has a shape as illustrated in FIG. 4B. The set of samples of the alias reducing pulse which is summed with the sequence of samples of the waveform depends on the phase of the reset. For purposes of illustration, the alias reducing pulse corresponding with the reset preceding sample time 4, includes a sample at sample time 2 with a magnitude of about 0, a sample at sample time 3 with a magnitude of about −0.35, a sample at sample time 4 with a magnitude of about +0.1 and a sample at sample time 5 with a magnitude of about zero. An alias reducing pulse of length four is shown for illustration, but a different length N may be used. The alias reducing pulses may be longer than the period of the waveform. The set of samples provided for correction of the reset in the window corresponding with sample time t=11, includes a sample at sample time 9 equal to about zero, a sample a sample time 10 equal to about −0.1, a sample at sample time 11 equal to about +0.35, and a sample at sample time 12 equal to about zero.

The shape of the alias reducing pulse can be determined by using a bandlimited impulse signal, called a sinc function. A windowing function selects N samples around the center of the bandlimited impulse. The windowing function and window length can be varied to obtain different alias reducing pulses. The windowed samples are integrated using a digital integration filter to produce a bandlimited step function, which starts at zero and increases (over N samples) to unity. Subtracting an ideal (non-bandlimited) step function from the bandlimited step function moves the discontinuity from the end of the signal to the origin. This produces an alias reducing pulse that starts at zero, ends at zero, has a discontinuity in the center, and has essentially no DC bias.

The pulse generation module is implemented in one embodiment by creating a lookup table that has a plurality of sets of samples shifted in phase of the alias reducing pulse. For example, a lookup table having 10 entries, each shifted in phase by an increment of 1/10 of the sample period is stored. The magnitudes of the entries can be scaled to an appropriate value, matching that of the non-bandlimited waveform. Alternatively, the magnitude of the entries could be adjusted on-the-fly as they are read out of the table, based on a signal indicating the magnitude of the waveform discontinuity. If the discontinuity occurs at a phase that is between entries in the table, then the values can be computed using interpolation for improved accuracy.

The resulting waveform and sequence of samples of the resulting waveform is shown in FIG. 4C, illustrating a bandlimited waveform substantially without perceptible aliasing at the sample rate of the system. The bandlimited waveform is produced using an elegant edge buffer, with a table lookup and summing operation, which is very efficient of computing resources with excellent results.

Figure 5:
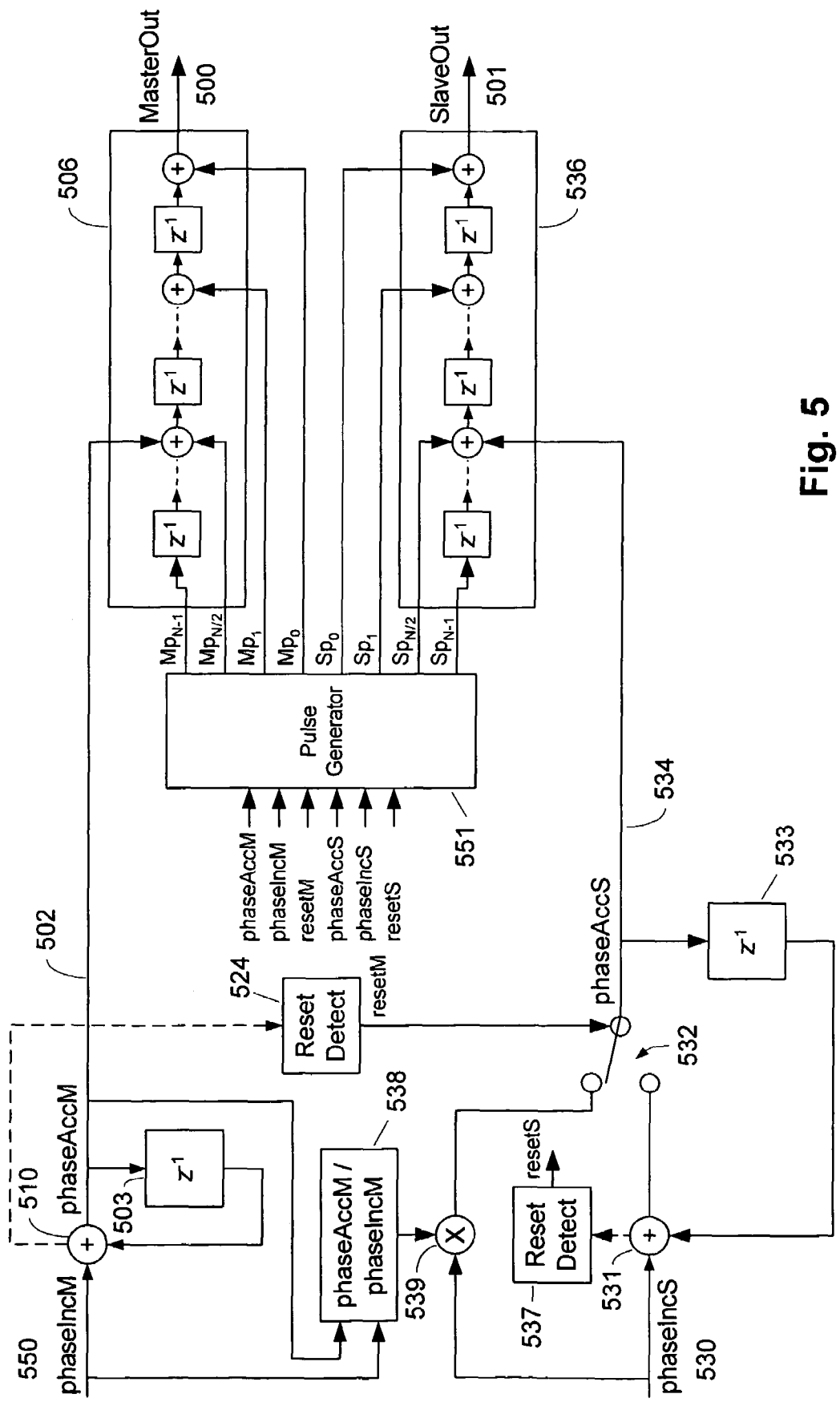
FIG. 5 illustrates a program for a hard sync, bandlimited sawtooth oscillator producing master and slave waveforms.

FIG. 5 illustrates a procedure for hard sync using a master sawtooth oscillator and a slave sawtooth oscillator. The procedure includes generating a master bandlimited waveform MasterOut on line 500 and a slave bandlimited waveform SlaveOut on line 501. The master waveform MasterOut on line 500 is generated using a phase accumulator like that described with reference to FIG. 2. A phase increment value phaseIncM is applied from line 550 to the input of a summing node 510. The output phaseAccM on line 502 of the summing node 510 is fed back through delay element 503 to a second input of the summing node 510. The summing node 510 wraps its output phaseAccM, as described above, at the magnitude of 1.0. A reset detect module 524 generates a control signal resetM, indicating that the summing node 510 has wrapped. A pulse generator 551 is responsive to the phaseIncM, phaseAccM and resetM signals to provide a set of samples $Mp_0$, $Mp_1$, ..., $Mp_{N/2}$, ... $Mp_{N-1}$ of an alias reducing pulse for the master waveform. An edge buffer 506 is used to combine the sequence of digital samples on line 502 with the set of samples of the alias reducing pulse. The edge buffer 506 is implemented like that of edge buffer 206 of FIG. 2, and not described further. The output waveform MasterOut on line 500 comprises a set of digital samples of a bandlimited waveform.

The slave waveform SlaveOut on line 501 is generated using a phase accumulator that is modified so that it also resets in response to events in the master waveform. A phase increment value phaseIncS is applied from line 530 to the input of a summing node 531. The output of the summing node 531 is applied to a switch 532, which normally selects the output of the summing node 531. The output phaseAccS of the switch 532 on line 534 is fed back through delay element 533 to a second input of the summing node 531. The summing node 531 wraps its output phaseAccS, as described above, at the magnitude of 1.0. A reset detect module 537 generates a control signal resetS, indicating that the summing node 531 has wrapped.

The switch 532 is controlled in response to the output resetM from the reset detector 524 that monitors the master summing node 510. After a reset in the master summing node 510, the switch 532 selects the output of the multiplier 539. The multiplier 539 multiplies the phase increment value phaseIncS from line 530 times a scale factor computed in block 538, to determine the magnitude of the sample following the reset in the master waveform. The scale factor computed in block 538 is equal to the value of the output phaseAccM of the summing node 510, divided by the phase increment value phaseIncM (modulo 1.0), from line 550 for the master so that it indicates a fractional value of the sampling interval, corresponding to the phase within the sampling interval at which the reset event occurred in the master waveform. When multiplied by the phaseIncS from line 530, the magnitude of the sample of phaseAccS following the reset event is determined.

Thus, the slave waveform has first type discontinuities that are caused by wrapping at the summing node 531, and second type discontinuities that are responsive to events in the master waveform, caused by wrapping at the summing node 510 in the illustrated example. Alias reducing pulses are provided to reduce aliasing for both types of discontinuities. In the typical embodiment, the first type discontinuities have a constant magnitude, an alias reducing pulse can be generated as described above with respect to that applied to the master waveform. The discontinuities that are responsive to events in the master waveform can have varying magnitudes. Thus, the alias reducing pulse for the discontinuities that are responsive to events in the master waveform must be scaled according to the magnitude of the discontinuity.

The pulse generator 551 is responsive to the phaseIncM, phaseAccM and resetM, phaseIncS, phaseAccS and resetS signals to provide a set of samples $Sp_0$, $Sp_1$, ... $Sp_{N/2}$, ... $Sp_{N-1}$ of an alias reducing pulse for the slave waveform, for both types of discontinuities. An edge buffer 536 is used to combine the sequence of digital samples on line 502 with the set of samples of the alias reducing pulse. The edge buffer 536 is implemented like that of edge buffer 206 of FIG. 2, and not described further. The output waveform SlaveOut on line 501 comprises a set of digital samples of a bandlimited sawtooth waveform.

Figure 6:
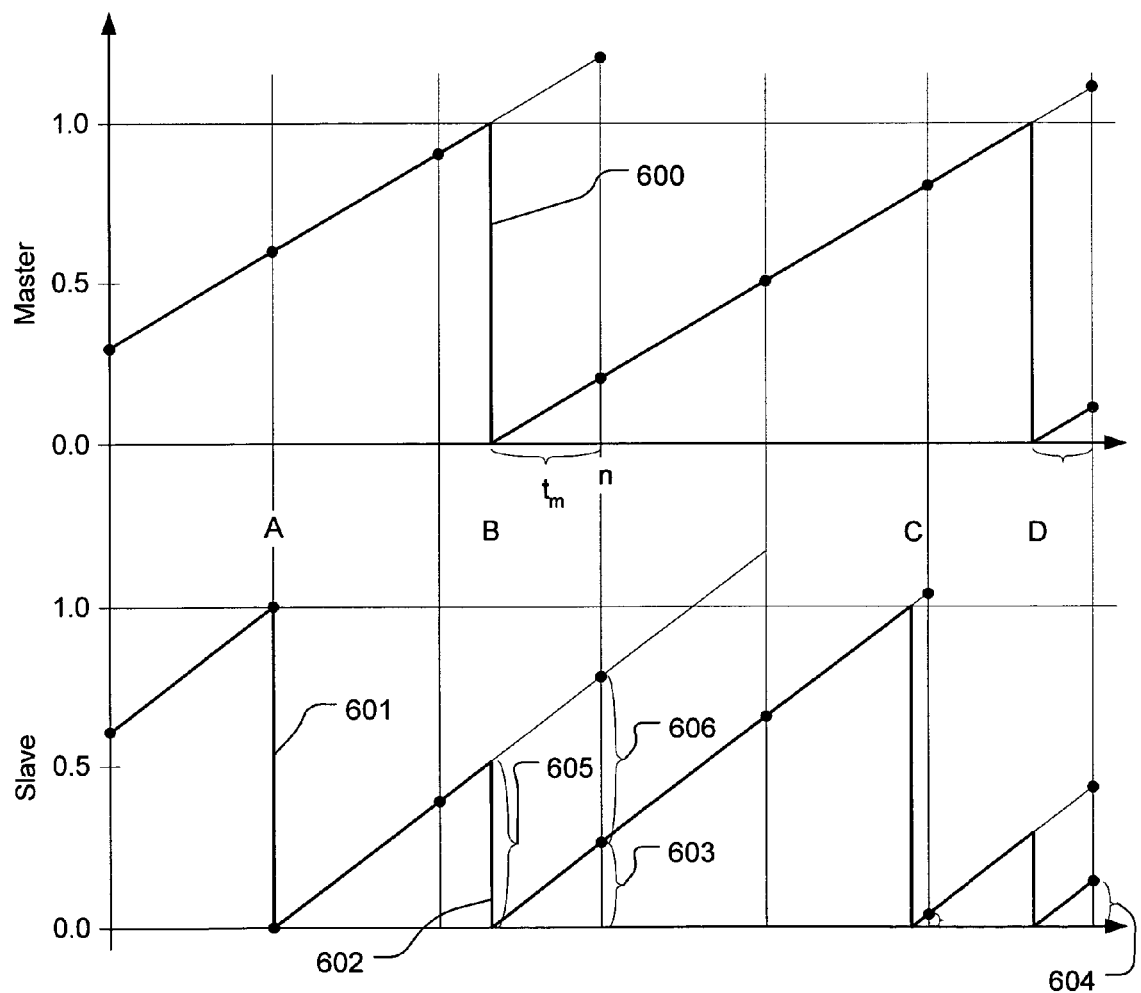
FIG. 6 is a graph illustrating non-bandlimited, master and slave sawtooth waveforms, and a sequence of digital samples of the waveforms.
Figure 7:
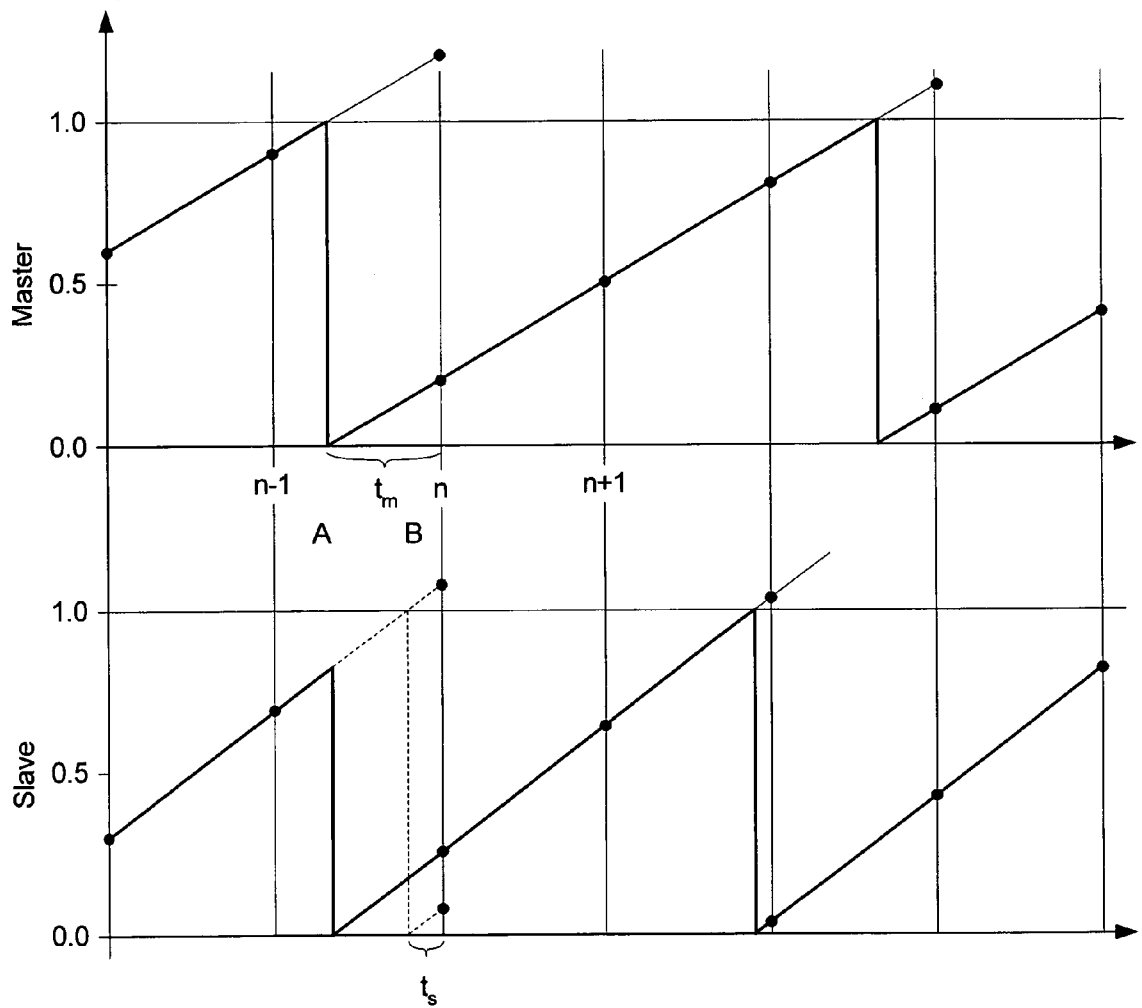
FIG. 7 is a graph illustrating non-bandlimited, master and slave sawtooth waveforms, and a sequence of digital samples of the waveforms, where resets in the master and slave waveforms occur in the same sampling interval, with the master reset first in time.
Figure 8:
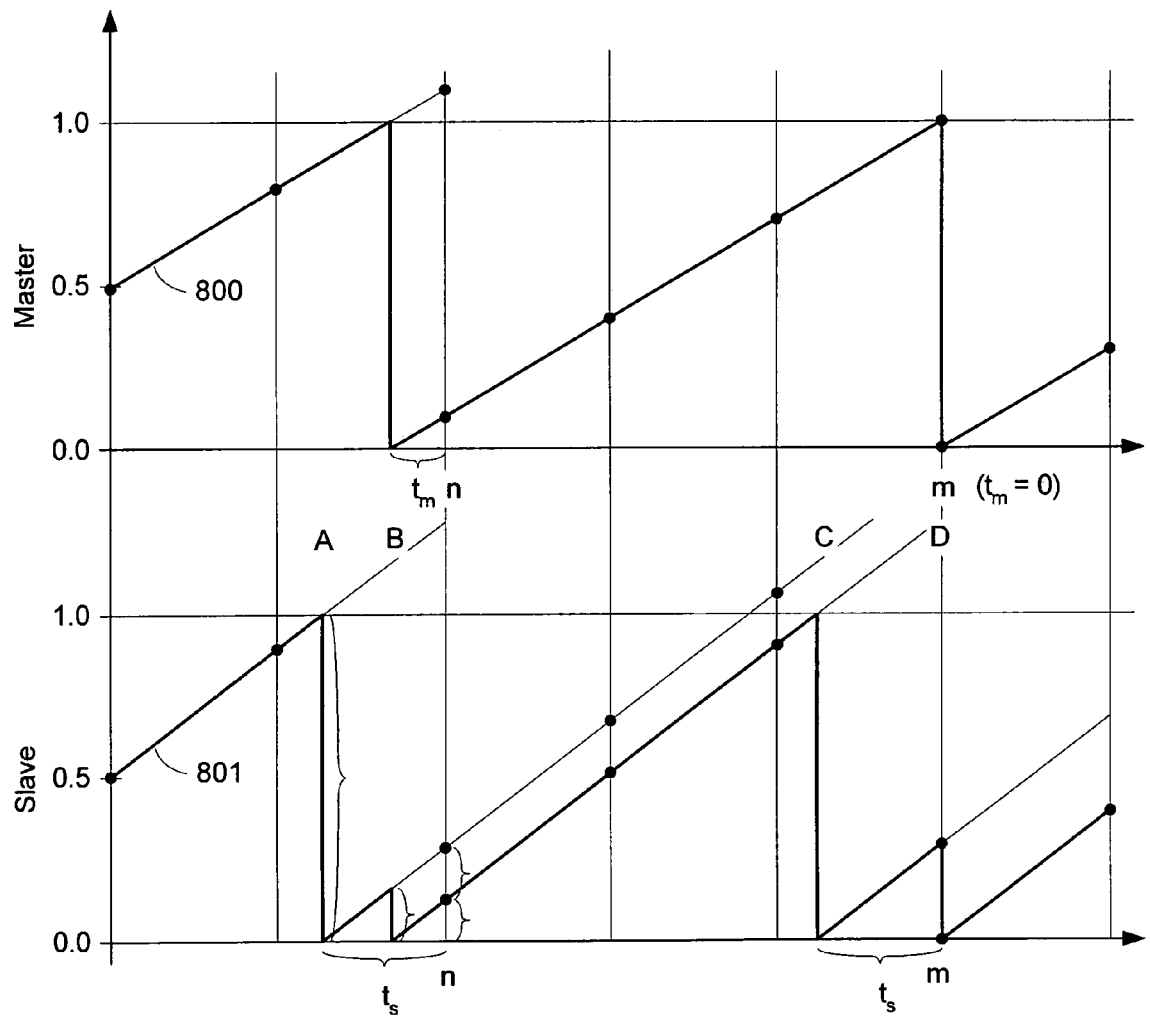
FIG. 8 is a graph illustrating non-bandlimited, master and slave sawtooth waveforms, and a sequence of digital samples of the waveforms, where resets in the master and slave waveforms occur in the same sampling interval, with the slave reset first in time.

FIGS. 6-8 illustrates three scenarios for the relative timing of the reset events in the master and slave waveforms for the hard sync procedure of FIG. 5. FIG. 6 illustrates the case in which the master waveform 600 resets periodically at the times B and D, with corresponding resets in the slave waveform, while the slave waveform 601 has first type resets at times A and C, in addition to resets at times B and D. In this case, the first type slave reset at times A and C, and the first type master reset at times B and D, are handled in the manner described above with respect to FIG. 2 by the pulse generator 551. The slave resets however, at times B and D, have magnitudes that are a function of the phase $t_m$ within the sampling interval in which the master reset occurs. The magnitude values are generated in response to the logic in block 538 and the multiplier 539 in the procedure of FIG. 5. The reset at time B occurred at a nominal phase equal to ⅔ of the sampling interval for the sample at time n. Therefore, the magnitude 603 of the sample of the slave waveform at time n is equal to ⅔ of slaveIncS. In the illustrated example, phaseIncS is 0.4 and phaseIncM is 0.3. The output of the multiplier 539 is about 0.266. The magnitude 604 of the sample of the slave waveform following the reset at time D is about 0.133, for a master reset that occurs at a nominal phase of ⅓.

The alias reducing pulse is scaled in response to the magnitude 605 of the step 602. The magnitude 605 of the step 602 is simply the difference 606 between the magnitude that the slave waveform would have achieved at the sample time following the reset in the absence of a hard sync reset, and the magnitude of the slave waveform that results from the reset. At the sample following the reset at time B, the magnitude of the step 602 in the slave waveform 601 is (0.8−0.266)=0.534. Therefore, the module 551 which generates the set of samples of the alias reducing pulse for the slave waveform to be aligned with the phase of the reset at time B, scales the magnitude of the samples by the scale factor 0.534. The module 551, which generates the set of samples of the alias reducing pulse for the slave waveform to be aligned with the phase of the reset at time D, scales the magnitude of the samples by the scale factor (0.466−0.133)=0.333.

FIG. 7 illustrates the case for the hard sync procedure in which both the master and the slave reset at phases $t_m$ and $t_s$ in the sampling interval corresponding to the same sample, sample n in the illustrated embodiment, and in which the master reset occurs first ($t_m > t_s$). Thus, the summing node 510 wraps at time A with phase $t_m = 2/3$ in the sampling interval corresponding to the sample n, while the summing node 531 wraps at time B with phase $t_s = 1/4$ in the same sampling interval. Because the master reset causes the phaseAccS on line 534 to fall in value before the first type wrap, the slave reset is deferred, and only one discontinuity in the slave waveform is addressed in the current sampling interval. In this case, the alias reducing pulse for the slave waveform is produced in the same manner as described with respect to FIG. 6.

FIG. 8 illustrates the case for the hard sync procedure in which both the master and slave reset at phases $t_m$ and $t_s$ in the same sampling interval corresponding to the same sample, samples n and m in the illustrated embodiment, and in which the slave resets before the master ($t_m < t_s$), resulting in two steps in phase in the non-bandlimited waveform within a single sampling interval. Thus, in effect two alias reducing pulses are required to compensate for the two discontinuities within the same sampling interval. In the illustrated embodiment, the master waveform 800 and the slave waveform 801 both reset in the sampling interval corresponding to sample n. The phase $t_s$ of the slave reset at time A is 3/4, with a magnitude of 1.0. The phase $t_m$ of the master reset at time B is 1/3, which also induces a slave reset at time B, with a phase of 1/3 and a magnitude of 0.166, computed as described with respect to FIG. 6. Alias reducing pulses for both discontinuities are combined in the pulse generator module 551, and applied to the slave edge buffer 536 to produce the bandlimited output waveform SlaveOut on line 501. Likewise, the phase $t_s$ of the slave reset at time C is 0.833, with a magnitude of 1.0. The phase $t_m$ of the master reset at time D is 0, which also induces a slave reset at time D, with a phase of 0 and a magnitude of 0.833 times the phaseIncS (0.4 in the illustrated embodiment), or 0.3332. The alias reducing pulses for both discontinuities, with respective phases and magnitudes, are determined and combined in the pulse generator module 551, and applied to the slave edge buffer 536.

Note that, embodiments of the technology use a single table including phase shifted sets of samples of an alias reducing pulse for generating the alias reducing pulses for both the master and slave waveforms, by a procedure accessing the table twice. In alternative embodiments, separate tables are used for the master and slave waveforms.

Figure 9:
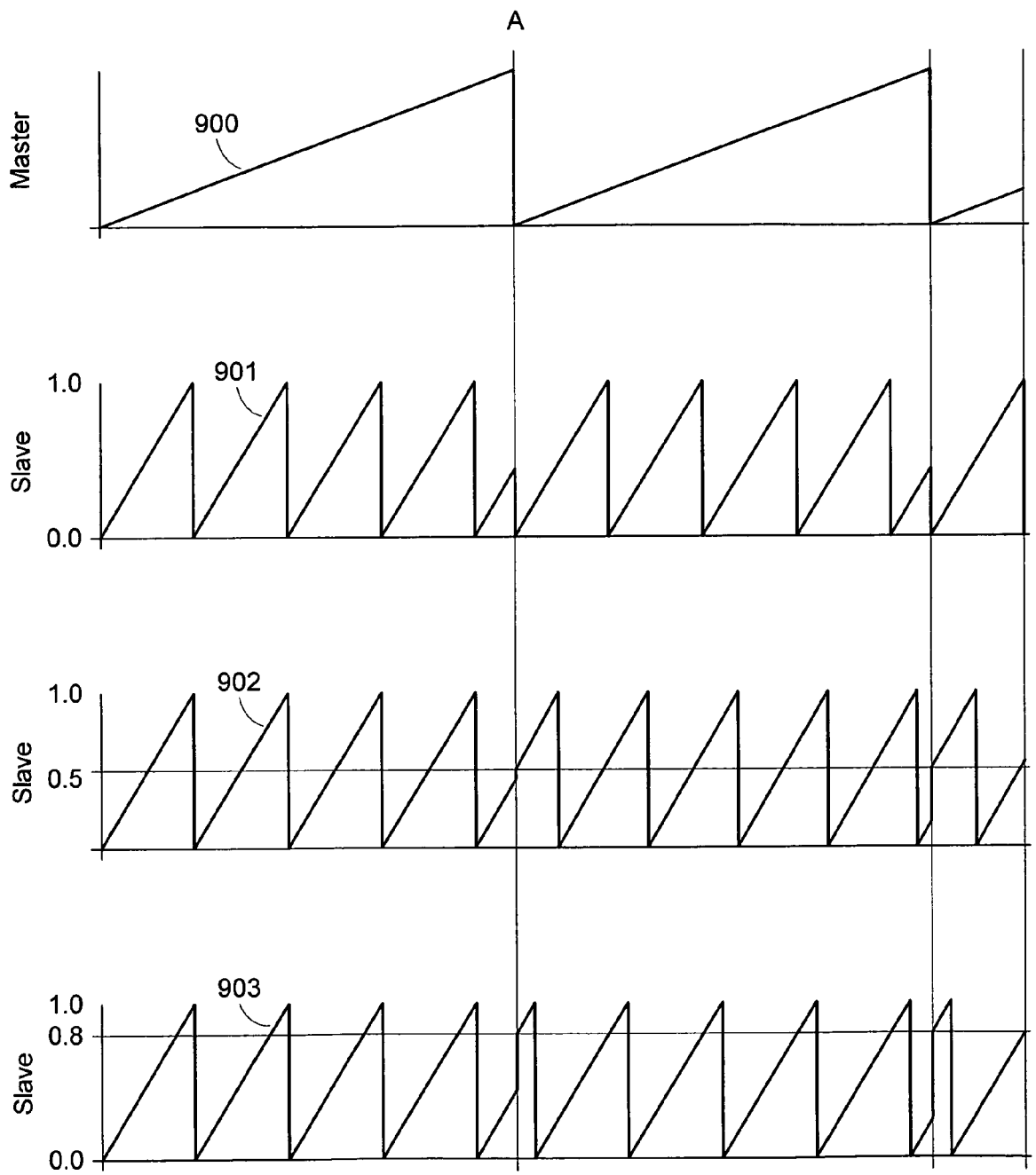
FIG. 9 is a graph illustrating a master waveform and various hard sync reset slave waveforms.

In the embodiments described with respect to FIGS. 6-8, the reset phaseAccS in the slave waveform that is generated in response to the discontinuity in the master waveform, is zero. Alternative embodiments use a nonzero reset phaseAccS value as illustrated in FIG. 9. FIG. 9 shows a master waveform 900 which resets at time A. A slave waveform with a reset phaseAccS value of zero is shown on trace 901, similar to that shown in FIG. 6. A slave waveform with a reset phaseAccS value of 0.5 is shown on trace 902. A slave waveform with a reset phaseAccS value of 0.8 is shown on trace 903. Embodiments of the invention apply alias reducing pulses for reducing aliasing caused by discontinuities in the slave waveforms like those shown in FIG. 9.

Figure 10:
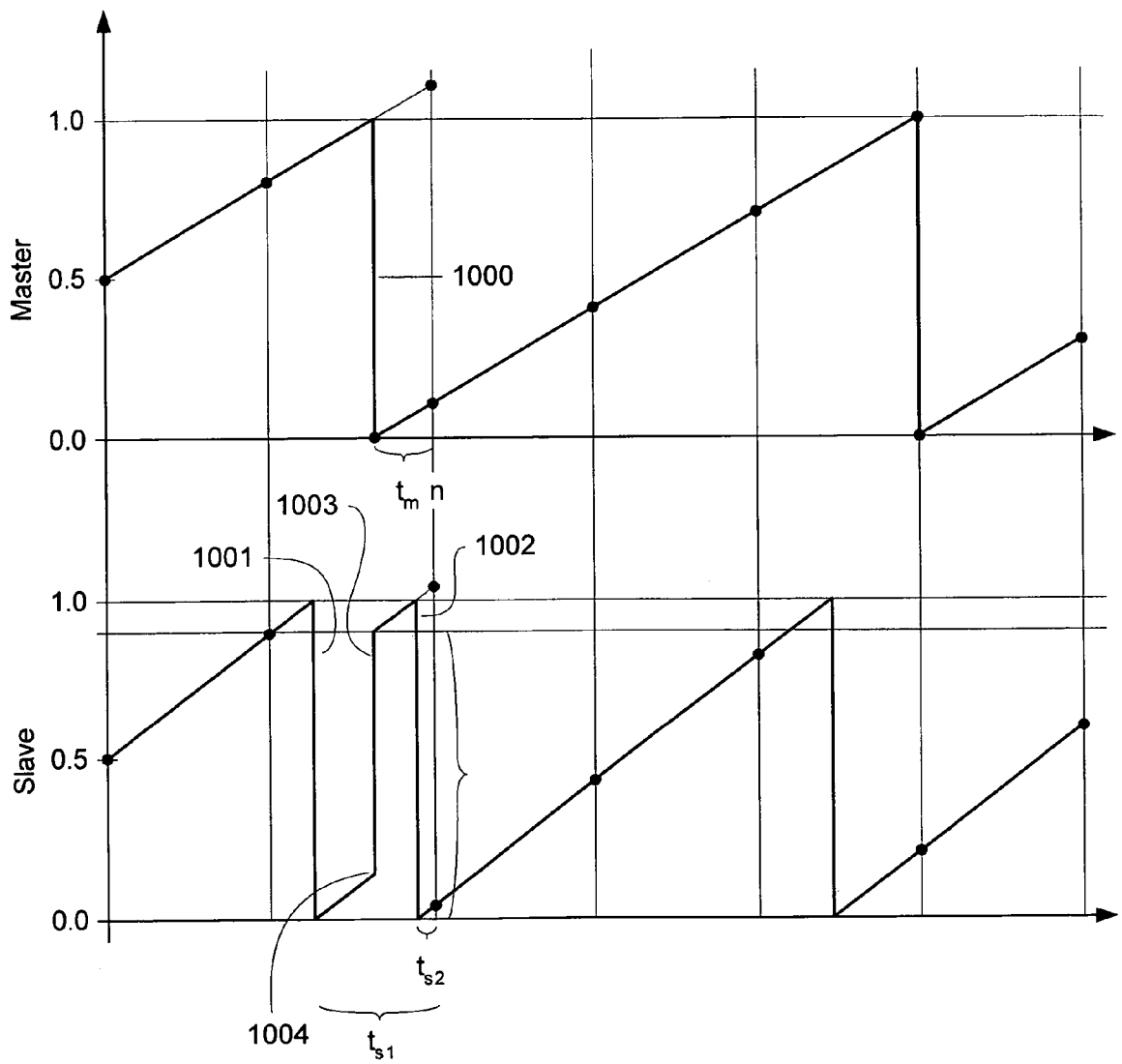
FIG. 10 is a graph illustrating a master waveform and hard sync reset slave waveform with a non-zero slave reset level.

FIG. 10 illustrates the case in which the nonzero reset phaseAccS is applied and a slave reset occurs before a master reset within a single sampling interval. The sequence results in a first type slave reset 1001 with phase $t_{s1}$ equal to 3/4, a master reset 1000 at time $t_m$ equal to 1/3, with a nonzero phase reset 1003 (magnitude 0.95 in the illustrated embodiment) responsive to the master reset 1000, and a first type slave reset 1002 at time $t_{s2}$. The magnitude of the upward step 1003 is equal to the difference between the reset phase (0.95) and the accumulation at point 1004 between the times $t_{s1}$ and $t_m$. The magnitude of the sample at time n is equal to the phaseAccS times the time $t_{s2}$, where $t_{s2}$ can be computed according to the following equation:

$$t_{s2} = ((syncResetPhase + (t_m)(phaseIncS)) - 1) / phaseIncS,$$
$$= (0.95 + (1/3)(0.4)) - 1)/0.4$$
$$= 0.0833/0.4$$
$$= 0.208$$

Alias reducing pulses are produced for the respective phases ($t_{s1}$, $t_m$ and $t_{s2}$) and magnitudes (1.0, −0.784, and 1.0) of each of the discontinuities in the slave waveform, and combined in the edge buffer for the slave. The alias reducing pulse for the step 1003 is inverted, to account for the opposite polarity step.

In the hard sync embodiments described above, the events in the master waveform which signal a reset in the slave waveform are simply resets or wraps of the accumulators. Other events can also trigger a reset in a slave waveform, such as a discontinuity, a threshold crossing, or the like. In a so-called soft sync procedure, an event that causes a reset in a slave waveform such as a reset or threshold crossing in the master waveform is only applied if the slave waveform is within a certain range. In addition, discontinuities at which alias reducing pulses are applied in the examples described above, are steps. In other embodiments, discontinuities consisting of any aberration in the master waveform which introduce significant magnitude, high-frequency components that result in perceptible aliasing can be corrected. In addition, in the examples described above, the discontinuity in the master cause a discontinuity in the slave during sampling intervals of the respective waveforms that coincide in time. In alternatives, the discontinuity in the master may occur in a sampling interval that does not coincide in time with the sampling interval in which the discontinuity in the slave is caused. For example, the phase of the discontinuity in the master could be applied to cause a discontinuity based on that phase, during a subsequent sampling interval of the slave waveform.

Figure 11:
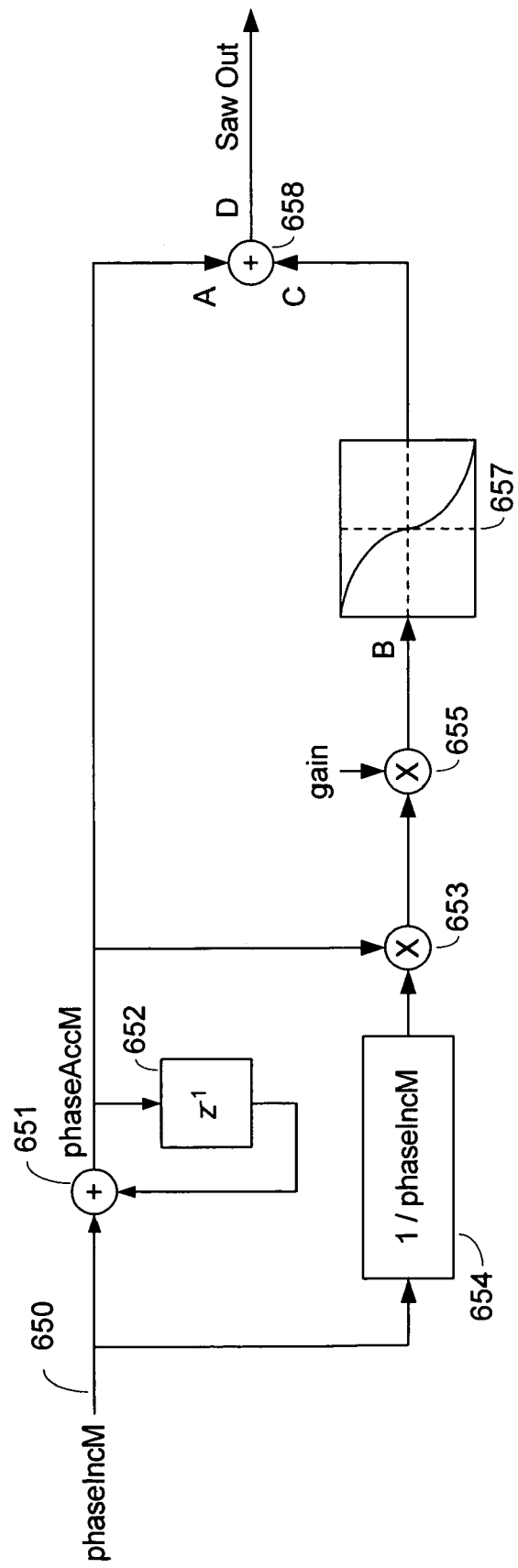
FIG. 11 illustrates another program for a bandlimited sawtooth oscillator.
Figure 12:
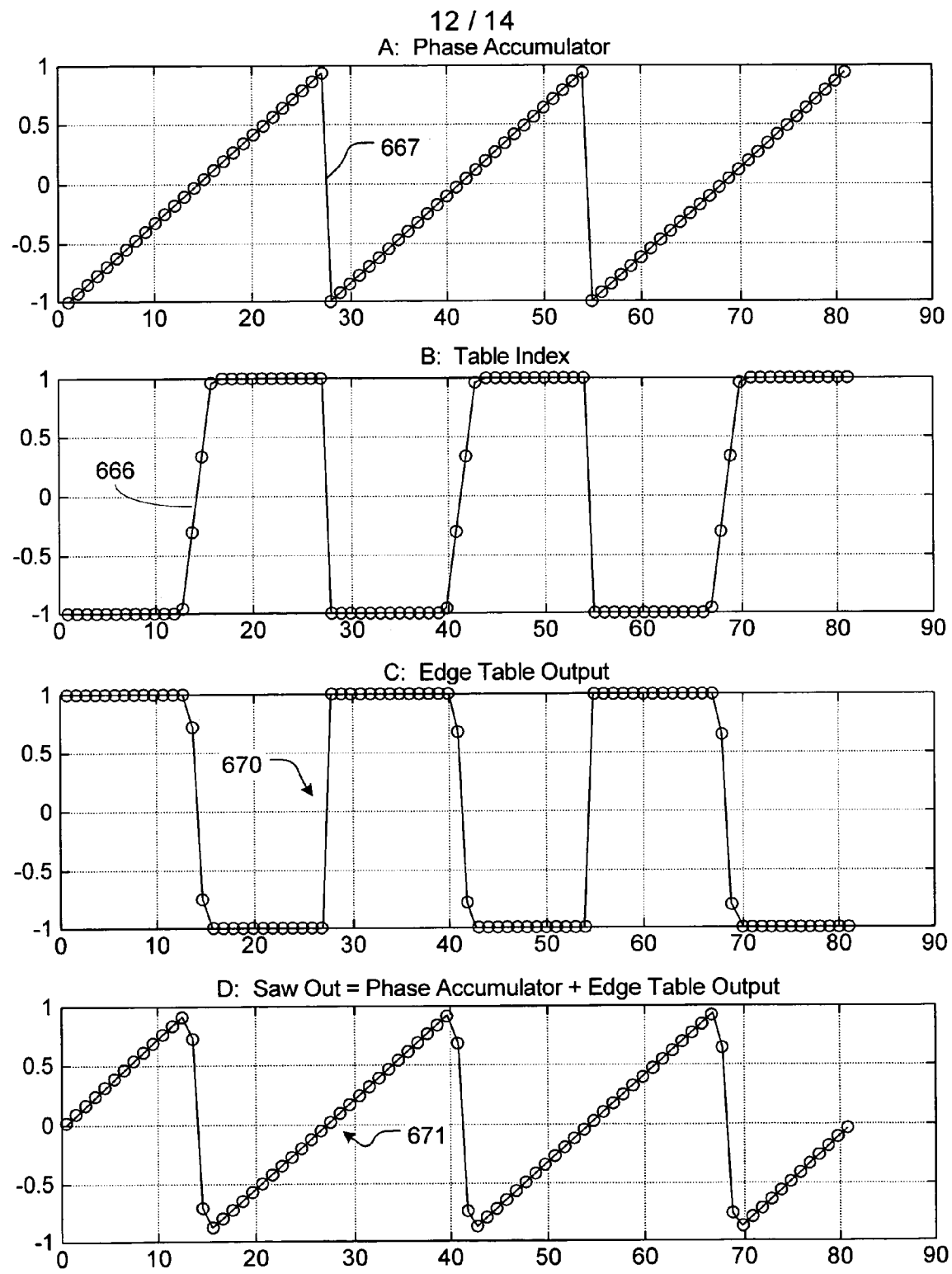
FIG. 12 illustrates waveforms at nodes A-D in the procedure of FIG. 11.

FIG. 11 illustrates an alternative technique for combining an alias reducing pulse with a non-bandlimited waveform to produce a bandlimited sawtooth waveform. FIG. 12 illustrates waveforms A, B, C and D from corresponding nodes in the diagram of FIG. 11. The procedure shown in FIG. 11 includes receiving a phase increment value phaseIncM on line 650 (nominally between 0 and 1), on one input of a summing node 651, the output of which is the set of samples phaseAccM represented by the graph A in FIG. 12. The value phaseAccM is fed back through delay element 652 to a second input of the summing node 651, and the non-bandlimited sawtooth waveform A is produced, scaled in this case so that it sweeps in magnitude between −1 and +1. To generate an alias reducing pulse, the value phaseAccM is also applied to the multiplier 653. A second input to the multiplier is a factor which is equal to the inverse of the phase increment value phaseIncM provided by block 654. The output of the multiplier 653 is applied to multiplier 655, which increases the magnitude of the signal by the "gain" value applied to the multiplier 655. The result is the waveform represented by the graph B shown in FIG. 12, which is clipped at −1 for negative high absolute values of phaseIncM on waveform A, and at 1.0 for positive high absolute values of phaseIncM, and including a linear ramp 666, around the zero crossing, with the slope which is determined by the "gain" factor. The waveform B is applied as inputs to the table 667, which in turn supplies an edge table output as shown on waveform C in FIG. 12, replacing the values of the input B with appropriate values for producing a non-bandlimited output. The output in graph C of the edge table 657 is applied along with the non-bandlimited sawtooth waveform as shown in the graph A, as inputs to adder 658. The alias reducing pulse provided by the table 657 has essentially no DC bias, and includes a set of samples (near 670) around the discontinuity 667 in the master waveform which sets the corresponding output D at the zero level 671, and which results in shifting the phase of the master reset by about 180 degrees. The resulting output is a bandlimited sawtooth waveform as shown in graph D.

Figure 13:
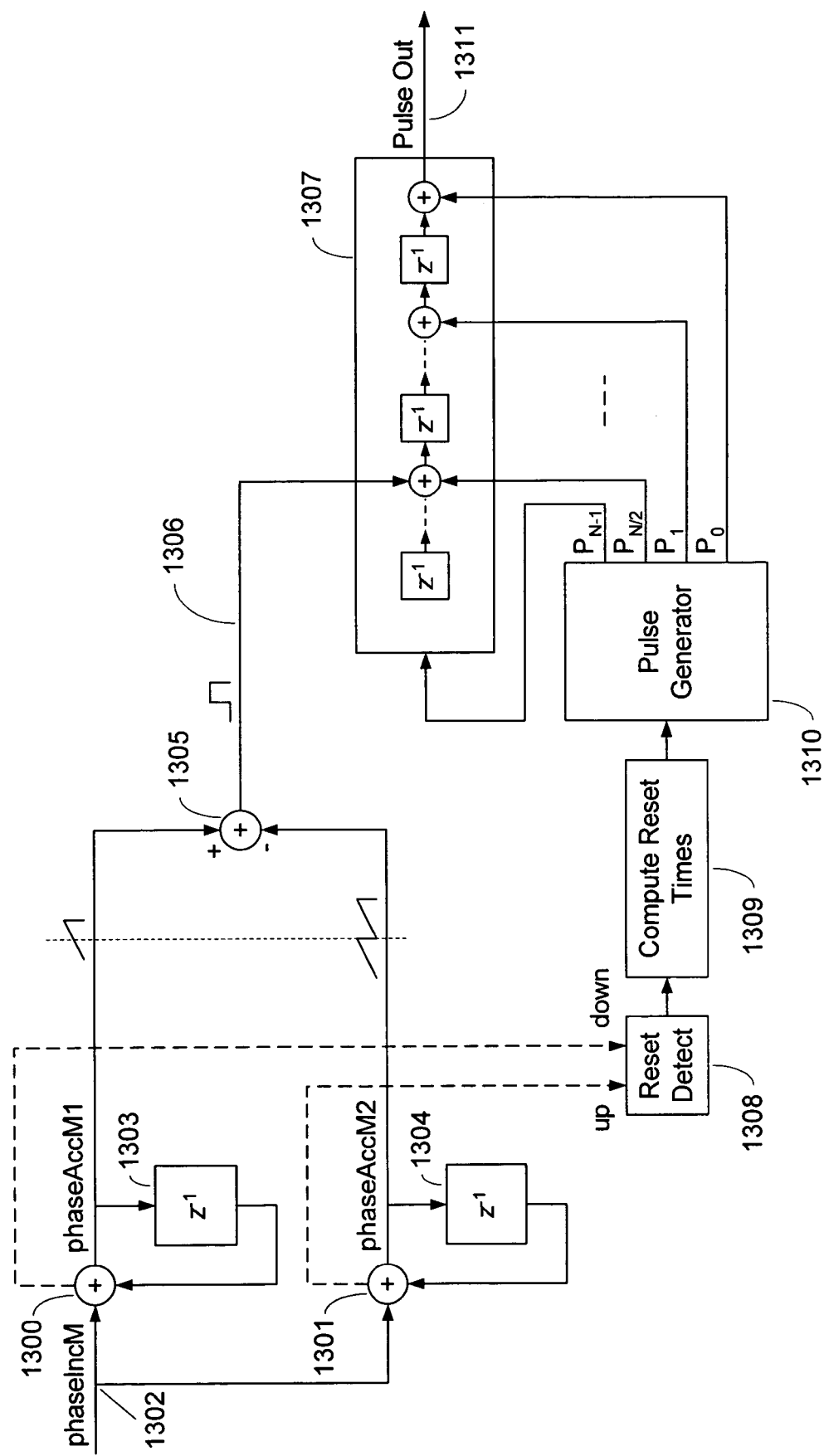
FIG. 13 illustrates a program for a bandlimited, squarewave pulse oscillator.
Figure 14:
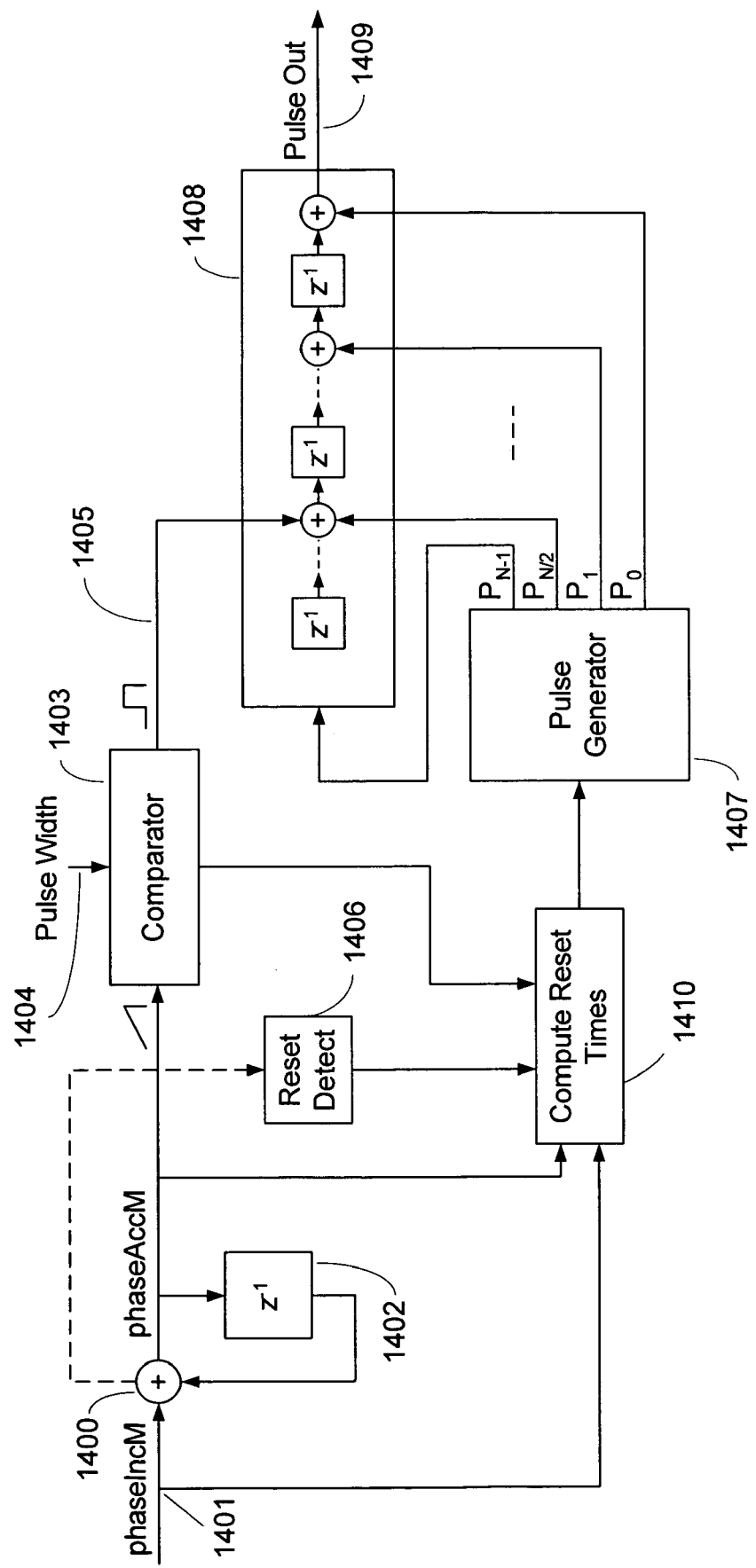
FIG. 14 illustrates another program for a bandlimited, squarewave pulse oscillator.

The techniques described above for producing alias reducing pulses can be applied in a variety of procedures commonly used in music synthesis. FIGS. 13 and 14 illustrate representative procedures. FIG. 13 illustrates a bandlimited pulse oscillator using two phase accumulators. Summing nodes 1300 and 1301 which are initialized out of phase by a pulse width value, receive a phase increment value phaseIncM on input 1302, and feedback from delay elements 1303 and 1304, respectively. The resulting sawtooth waveforms are out of phase by the initialized out of phase value, and subtracted in node 1305. The result is a pulse train on line 1306 which is applied to an edge buffer 1307. A reset detect module 1308 detects a reset event in the summing node 1300 indicating a down transition in the pulse waveform on line 1306, and a reset event in the summing node 1301 indicating an up transition in the pulse waveform on line 1306. The transitions constitute discontinuities of constant magnitude. Thus a module 1309 computes the reset times, and applies the reset times to a pulse generator 1310. The pulse generator provides a set of samples $P_0, P_1, \ldots, P_{N/2}, \ldots P_{N-1}$ of an alias reducing pulse for each transition, with the appropriate polarity for the up and down transitions in the pulse waveform. The resulting bandlimited pulse output is applied on line 1311.

FIG. 14 illustrates an alternative embodiment of a bandlimited pulse oscillator. A phase accumulator based on summing node 1400 is included. The summing node 1400 receives a phase increment value phaseIncM on line 1401, along with feedback through delay element 1402. The output phaseAccM is a non-bandlimited sawtooth waveform which is applied as an input to comparator 1403. The threshold is applied as a pulse width value on line 1404 to comparator 1403. The output of the comparator on line 1405 is a non-bandlimited pulse train. Reset detector 1406 detects a reset in the summing node 1400, which corresponds with a down transition in the pulse train on line 1405. Also, the comparator 1403 signals the up transition in the pulse train on line 1405. A module 1410 computes the reset times in response to the reset detector 1406, the comparator 1403, and the values of phaseIncM and phaseAccM. The module 1406 applies control signals to the pulse generator 1407 which provides a set of samples $P_0, P_1, \ldots, P_{N/2}, \ldots P_{N-1}$ of an alias reducing pulse for each transition in the pulse train on line 1405, with appropriate polarity for up and down transitions. Edge buffer 1408 combines the sequence of samples from line 1405 with the set of samples $P_0, P_1, P_{N/2}, \ldots P_{N-1}$, and provides a bandlimited pulse train on line 1409.

The techniques described herein are readily extended to hard sync procedures, pulse oscillators and other types of waveform generators, ring modulation oscillators, pulse width multipliers, square oscillators with octave dividers, and other procedures for producing bandlimited waveforms.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for generating a bandlimited digital signal in a waveform synthesizer, comprising:
   generating, using the waveform synthesizer, a sequence of digital samples representing values of an analog waveform within respective sampling intervals of a waveform having a first fundamental frequency and having a discontinuity with a phase within a particular sampling interval; and
   summing, using the waveform synthesizer, the sequence of digital samples around the discontinuity with a set of digital samples of an alias reducing pulse, based on the phase of the discontinuity and having essentially no DC bias, to provide a digital output waveform.

2. A method for generating a bandlimited digital signal in a waveform synthesizer, comprising:
   generating a sequence of digital samples using the waveform synthesizer representing values of an analog waveform within respective sampling intervals of a waveform having a first fundamental frequency and having a discontinuity with a phase within a particular sampling interval; and
   summing the sequence of digital samples around the discontinuity using the waveform synthesizer with a set of digital samples of an alias reducing pulse, based on the phase of the discontinuity to provide a digital output waveform, wherein the alias reducing pulse is odd symmetric relative to the phase of the discontinuity.

3. The method of claim 2, including detecting the phase of the discontinuity, and determining values of samples in the set of digital samples based on the phase.

4. The method of claim 2, including determining a first magnitude of the waveform prior to the discontinuity and a second magnitude of the waveform after the discontinuity, and determining values of samples in the set of digital samples based on the difference between the first and second magnitudes.

5. The method of claim 2, wherein the waveform comprises a sawtooth waveform.

6. The method of claim 2, wherein the waveform comprises a square waveform.

7. The method of claim 2, wherein the waveform comprises a pulse waveform.

8. The method of claim 2, including storing a table of sets of digital values for respective alias reducing pulses, and providing the set of digital samples based on a table look up process.

9. The method of claim 2, including storing a table of sets of digital values for respective alias reducing pulses, and providing the set of digital samples based on a table look up and interpolation process.

10. The method of claim 2, including storing a subset of the sequence of digital samples in a buffer, and adding the set of digital samples of the alias reducing pulse to the subset using the buffer.

11. The method of claim 2, wherein the set of digital samples of the alias reducing pulse includes N members, and including shifting a subset of the sequence of digital samples into a first-in-first-out buffer having a length of at least N−1, and adding the set of digital samples to the subset using the first-in-first-out buffer.

12. The method of claim 2, wherein the waveform has a slope that is substantially equal on both sides of the discontinuity.

13. The method of claim 2, including transducing the digital output waveform into sound.

14. The method of claim 2, including transducing the digital output waveform into an analog waveform.

15. A system for generating a bandlimited digital signal, comprising:
  data processing resources, including memory storing instructions adapted for execution by the data processing resources, and
  wherein the data processing resources comprise logic which generates a sequence of digital samples representing values of an analog waveform within respective sampling intervals of a waveform having a first fundamental frequency and having a discontinuity with a phase within a particular sampling interval; and sums the sequence of digital samples around the discontinuity with a set of digital samples of an odd-symmetric alias reducing pulse, based on the phase of the discontinuity, to provide a digital output waveform.

16. The system of claim 15, including logic to detect the phase of the discontinuity, and determine values of samples in the set of digital samples based on the phase.

17. The system of claim 15, including logic to determine a first magnitude of the waveform prior to the discontinuity and a second magnitude of the waveform after the discontinuity, and determine values of samples in the set of digital samples based on the difference between the first and second magnitudes.

18. The system of claim 15, wherein the waveform comprises a sawtooth waveform.

19. The system of claim 15, wherein the waveform comprises a square waveform.

20. The system of claim 15, wherein the waveform comprises a pulse waveform.

21. The system of claim 15, including resources to store a table of sets of digital values for respective alias reducing pulses, and logic to provide the set of digital samples based on a table look up process.

22. The system of claim 15, including resources to store a table of sets of digital values for respective alias reducing pulses, and logic to provide the set of digital samples based on a table look up and interpolation process.

23. The system of claim 15, including logic to store a subset of the sequence of digital samples in a buffer, and add the set of digital samples of the alias reducing pulse to the subset using the buffer.

24. The system of claim 15, wherein the set of digital samples of the alias reducing pulse includes N members, and including logic to shift a subset of the sequence of digital samples into a first-in-first-out buffer having a length of at least N−1, and adding the set of digital samples to the subset using the first-in-first-out buffer.

25. The system of claim 15, wherein the waveform has a slope that is substantially equal on both sides of the discontinuity.

26. The system of claim 15, including resources to transduce the digital output waveform into sound.

27. The system of claim 15, including resources to transduce the digital output waveform into an analog waveform.

28. A method for generating a bandlimited digital signal in a waveform synthesizer, comprising:
  generating using the waveform synthesizer a first sequence of digital samples representing values of an analog waveform within respective sampling intervals of a first waveform having a first fundamental frequency and having a first waveform event with a first phase within a first particular sampling interval;
  generating using the waveform synthesizer a second sequence of digital samples representing values of an analog waveform within respective sampling intervals of a second waveform having a second fundamental frequency and having a second waveform discontinuity with a second phase within a second particular sampling interval, wherein the second phase is a function of the first phase, and wherein the second waveform has first and second magnitudes before and after the discontinuity, respectively, that are a function of the second phase;
  providing using the waveform synthesizer a set of digital samples of an odd symmetric alias reducing pulse based on the second phase and the first and second magnitudes; and
  summing using the waveform synthesizer the second sequence of digital samples around the second discontinuity with the set of digital samples of an alias reducing pulse to provide a digital output waveform.

29. The method of claim 28, wherein the first and second sampling intervals coincide in time.

30. The method of claim 28, wherein the second waveform includes another discontinuity in the second particular window before the second phase, and including determining an additional alias reducing pulse based on the phase of the other discontinuity, and wherein the set of digital samples is based on a combination of the odd symmetric alias reducing pulse and the additional alias reducing pulse.

31. The method of claim 28, wherein the event in the first waveform comprises a discontinuity, and including:
  providing an additional set of digital samples of an alias reducing pulse based on the first phase; and
  summing the first sequence of digital samples around the first discontinuity with the additional set of digital samples.

32. The method of claim 28, including detecting the relative timing of the first and second phases, and determining magnitudes of samples in the set of digital samples based on the relative timing.

33. The method of claim 28, wherein the first waveform comprises a sawtooth waveform.

34. The method of claim 28, wherein the first waveform comprises a square waveform.

35. The method of claim 28, wherein the first waveform comprises a pulse waveform.

36. The method of claim 28, including storing a first table of sets of digital values for respective alias reducing pulses corresponding to discontinuities at different phases, and providing the set of digital samples based on a table look up process.

37. The method of claim 28, including storing a first table of sets of digital values for respective alias reducing pulses corresponding to discontinuities at different phases, and providing the set of digital samples based on a table look up process with interpolation.

38. The method of claim 28, including storing a subset of the second sequence of digital samples in a buffer, and adding the set of digital samples to the subset using the buffer.

39. The method of claim 28, wherein the set of digital samples of the alias reducing pulse includes N members, and including shifting a subset of the second sequence of digital samples into a first-in-first-out buffer having a length of at least N−1, and adding the set of digital samples to the subset using the first-in-first-out buffer.

40. The method of claim 28, wherein the second waveform has a slope that is substantially equal on both sides of the discontinuity.

41. The method of claim 28, including transducing the digital output waveform into sound.

42. The method of claim 28, including transducing the digital output waveform into an analog waveform.

43. A system for generating a bandlimited digital signal, comprising:
   data processing resources, including memory storing instructions adapted for execution by the data processing resources, and
   wherein the data processing resources comprise logic which generates a first sequence of digital samples representing values of an analog waveform within respective sampling intervals of a first waveform having a first fundamental frequency and having a first waveform event with a first phase within a first particular sampling interval;
   generates a second sequence of digital samples representing values of an analog waveform within respective sampling intervals of a second waveform having a second fundamental frequency and having a second waveform discontinuity with a second phase within a second particular sampling interval, wherein the second phase is a function of the first phase, and wherein the second waveform has first and second magnitudes before and after the discontinuity, respectively, that are a function of the second phase;
   provides a set of digital samples of an odd symmetric alias reducing pulse based on the second phase and the first and second magnitudes; and
   sums the second sequence of digital samples around the second discontinuity with the set of digital samples of an odd symmetric alias reducing pulse to provide a digital output waveform.

44. The system of claim 43, wherein the first and second sampling intervals coincide in time.

45. The system of claim 43, wherein the second waveform includes another discontinuity in the second particular window before the second phase, and including logic to determine an additional alias reducing pulse based on a phase of the other discontinuity, and wherein the set of digital samples is based on a combination of the odd symmetric alias reducing pulse and the additional alias reducing pulse.

46. The system of claim 43, wherein the event in the first waveform comprises a discontinuity, and including logic to:
   provide an additional set of digital samples of another alias reducing pulse based on the first phase; and
   sum the first sequence of digital samples around the first discontinuity with the additional set of digital samples.

47. The system of claim 43, including logic to detect the relative timing of the first and second phases, and to determine magnitudes of samples in the set of digital samples based on the relative timing.

48. The system of claim 43, wherein the first waveform comprises a sawtooth waveform.

49. The system of claim 43, wherein the first waveform comprises a square waveform.

50. The system of claim 43, wherein the first waveform comprises a pulse waveform.

51. The system of claim 43, including resources to store a first table of sets of digital values for respective alias reducing pulses corresponding to discontinuities at different phases, and logic to provide the set of digital samples based on a table look up process.

52. The system of claim 43, including resources to store a first table of sets of digital values for respective alias reducing pulses corresponding to discontinuities at different phases, and logic to provide the set of digital samples based on a table look up process with interpolation.

53. The system of claim 43, including resources to store a subset of the second sequence of digital samples in a buffer, and logic to add the set of digital samples to the subset using the buffer.

54. The system of claim 43, wherein the set of digital samples of an odd symmetric alias reducing pulse includes N members, and including logic to shift a subset of the second sequence of digital samples into a first-in-first-out buffer having a length of at least N−1, and to add the set of digital samples to the subset using the first-in-first-out buffer.

55. The system of claim 43, wherein the second waveform has a slope that is substantially equal on both sides of the discontinuity.

56. The system of claim 43, including resources to transduce the digital output waveform into sound.

57. The system of claim 43, including resources to transduce the digital output waveform into an analog waveform.

58. A method for generating a bandlimited digital signal in a waveform synthesizer, comprising:
   generating, using the waveform synthesizer, a first sequence of digital samples representing values of an analog waveform within respective sampling intervals of a first waveform having a first fundamental frequency and having a first waveform event with a first phase within a first particular sampling interval;
   generating, using the waveform synthesizer, a second sequence of digital samples representing values of an analog waveform within respective sampling intervals of a second waveform having a second fundamental frequency and having a second waveform discontinuity with a second phase within a second particular sampling interval, wherein the second phase is a function of the first phase, and wherein the second waveform has first and second magnitudes before and after the discontinuity, respectively, that are a function of the second phase;
   providing, using the waveform synthesizer, a set of digital samples of an alias reducing pulse based on the second phase and the first and second magnitudes; and
   summing, using the waveform synthesizer, the second sequence of digital samples around the second discontinuity with the set of digital samples to provide a digital output waveform.

59. A system for generating a bandlimited digital signal, comprising:
   data processing resources, including memory storing instructions adapted for execution by the data processing resources, and
   wherein the data processing resources comprise logic which generates a first sequence of digital samples representing values of an analog waveform within respective sampling intervals of a first waveform having a first fundamental frequency and having a first waveform event with a first phase within a first particular sampling interval;
   generates a second sequence of digital samples representing values of an analog waveform within respective sampling intervals of a second waveform having a second fundamental frequency and having a second waveform discontinuity with a second phase within a second particular sampling interval, wherein the second phase is a function of the first phase, and wherein the second waveform has first and second magnitudes before and after the discontinuity, respectively, that are a function of the second phase;

provides a set of digital samples of an alias reducing pulse based on the second phase and the first and second magnitudes; and sums the second sequence of digital samples around the second discontinuity with the set of digital samples to provide a digital output waveform.

60. A method for generating a bandlimited digital signal, comprising:

generating a sequence of digital samples representing values of an analog waveform within respective sampling intervals of a waveform having a first fundamental frequency and having a discontinuity with a phase within a particular sampling interval;

summing the sequence of digital samples around the discontinuity with a set of digital samples of an odd symmetric alias reducing pulse, based on the phase of the discontinuity, to provide a digital output waveform; and transducing the digital output waveform into an analog waveform.

* * * * *

UNITED STATES PATENT AND TRADEMARK OFFICE
CERTIFICATE OF CORRECTION

PATENT NO. : 7,589,272 B2  Page 1 of 1
APPLICATION NO. : 11/028383
DATED : September 15, 2009
INVENTOR(S) : Leary et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Fourteenth Day of December, 2010

David J. Kappos
*Director of the United States Patent and Trademark Office*